(12) United States Patent
Belle

(10) Patent No.: US 12,456,135 B2
(45) Date of Patent: Oct. 28, 2025

(54) SYSTEMS FOR INTEGRATING ONLINE REVIEWS WITH POINT OF SALE (POS) OR EPOS (ELECTRONIC POINT OF SALE) SYSTEM

(71) Applicant: Denise Marie Belle, Syracuse, NY (US)

(72) Inventor: Denise Marie Belle, Syracuse, NY (US)

( * ) Notice: Subject to any disclaimer, the term of this patent is extended or adjusted under 35 U.S.C. 154(b) by 0 days.

(21) Appl. No.: 18/458,616

(22) Filed: Aug. 30, 2023

(65) Prior Publication Data
US 2023/0410161 A1    Dec. 21, 2023

Related U.S. Application Data

(63) Continuation of application No. 16/827,359, filed on Mar. 23, 2020, now abandoned, which is a continuation of application No. 15/341,431, filed on Nov. 2, 2016, now abandoned.

(60) Provisional application No. 62/249,420, filed on Nov. 2, 2015.

(51) Int. Cl.
| | |
|---|---|
| G06Q 30/0282 | (2023.01) |
| G06Q 20/20 | (2012.01) |
| G06Q 20/32 | (2012.01) |
| G06Q 30/0251 | (2023.01) |

(52) U.S. Cl.
CPC ....... *G06Q 30/0282* (2013.01); *G06Q 20/202* (2013.01); *G06Q 20/209* (2013.01); *G06Q 20/3276* (2013.01); *G06Q 30/0255* (2013.01)

(58) Field of Classification Search
None
See application file for complete search history.

(56) References Cited

U.S. PATENT DOCUMENTS

| | | |
|---|---|---|
| 6,251,017 B1 | 6/2001 | Leason |
| 6,502,745 B1 | 1/2003 | Stimson |
| 2004/0128183 A1 | 7/2004 | Challey |

(Continued)

OTHER PUBLICATIONS

Onfro, Jillian. "A Whopping 20% Of Yelp Reviews Are Fake." Business Insider. N.p. Sep. 25, 2013.—Retrieved from the Internet: http://www.businessinsider.com/20-percent-of-yelp-reviews-fake-2013-9 (retrieved on Dec. 1, 2016.).

(Continued)

*Primary Examiner* — Michael J Sittner
(74) *Attorney, Agent, or Firm* — Husch Blackwell LLP; Rachael Lea Leventhal

(57) ABSTRACT

The system for integrating online ratings with a point of sale system includes a server and a point of sale (POS) system. The POS sends transaction information for the transaction to the server. A code is generated by the server in response to receiving the transaction information and sent to the POS. A receipt for the transaction is generated by the POS and provided to the customer, the receipt including the code. A user computer is operated by the customer and receives the code from the receipt. The user computer sends the code to the server and the server validates it to confirm the transaction took place between the customer and the business. A review of the business is created by the customer with the user computer only after the code has been validated.

20 Claims, 19 Drawing Sheets

(56) References Cited

U.S. PATENT DOCUMENTS

| | | | | |
|---|---|---|---|---|
| 2005/0043996 | A1* | 2/2005 | Silver | G06Q 30/02 |
| | | | | 705/15 |
| 2005/0222854 | A1* | 10/2005 | Dale | G06Q 20/102 |
| | | | | 705/40 |
| 2009/0119264 | A1 | 5/2009 | Bostic | |
| 2009/0182589 | A1 | 7/2009 | Kendall | |
| 2012/0048925 | A1* | 3/2012 | Suzuki | G07G 1/145 |
| | | | | 235/462.11 |
| 2013/0110604 | A1 | 5/2013 | Rooke | |
| 2013/0173389 | A1 | 7/2013 | Page | |
| 2013/0197984 | A1 | 8/2013 | Bhatt | |
| 2013/0297414 | A1* | 11/2013 | Goldfarb | G06Q 30/06 |
| | | | | 705/14.51 |
| 2013/0332732 | A1 | 12/2013 | Kunin | |
| 2014/0081783 | A1 | 3/2014 | Paranjape | |
| 2014/0222545 | A1* | 8/2014 | Hajji | G06Q 20/20 |
| | | | | 705/16 |
| 2014/0222548 | A1 | 8/2014 | Fagalde | |
| 2014/0337098 | A1 | 11/2014 | Ganesh | |
| 2015/0149267 | A1 | 5/2015 | Thakker | |
| 2015/0193765 | A1* | 7/2015 | Gadotti | G06Q 20/3274 |
| | | | | 705/39 |
| 2015/0193806 | A1 | 7/2015 | Tarailo | |
| 2016/0055430 | A1 | 2/2016 | Naji | |
| 2017/0016623 | A1 | 1/2017 | Rabie | |
| 2017/0098227 | A1 | 4/2017 | Cook | |
| 2017/0124540 | A1 | 5/2017 | Chan | |

OTHER PUBLICATIONS

Abbruzzese, Jason. "Amazon Is Suing More than 1,000 People for Posting Fake Reviews." Mashable, Oct. 18, 2015, Retrieved from the Internet: http://mashable.com/2015/10/18/amazon-fake-review-lawsuit/?utm_cid=mash-com-Twmain-link#Qq.d52ikgZqt. (retrieved on Dec. 1, 2016.).

Tuttle, Brad. "Amazon Lawsuit Shows That Fake Online Reviews Are a Big Problem." Time, Time, Jun. 19, 2015, Retrieved from the Internet: http://time.com/money/4078632/amazon-fake-online-reviews/. (retrieved on Dec. 1, 2016.).

Angeles, Sara. "Best POS Systems 2016." Business News Daily, 14 Sep. 2016, Retrieved from the Internet: http://www.businessnewsdaily.com/2955-best-pos-systems.html. (retrieved on Dec. 7, 2016.).

Hopp, Ryan. "Boost Your Business: Why Your Website Needs Testimonials." Perfect Search Media, Aug. 2, 2016, Retrieved from the Internet: http://www.perfectsearchmedia.com/blog/boost-your-business-why-your-website-needstestimonials/?utm_keyword=422986250. (retrieved on Dec. 1, 2016.).

Brignall, Miles. "Competition Regulator to Probe Fake Online Reviews." The Guardian, Guardian News and Media, Jun. 19, 2015, Retrieved from the Internet: https://www.theguardian.com/money/2015/jun/19/competition-regulator-toprobe-fake-online-reviews. (retrieved on Dec. 1, 2016.).

"Global Trust in Advertising." Global Trust in Advertising—2015, Retrieved from the Internet: http://www.nielsen.com/us/en/insights/reports/2015/global-trust-in-advertising-2015.html. (retrieved on Dec. 1, 2016.).

"Local Consumer Review Survey." Retrieved from the Internet: https://www.brightlocal.com/learn/local-consumerreview-survey/ (retrieved on Dec. 1, 2016.).

Peachey, Kevin. "Online Reviews 'Used as Blackmail'." BBC News, Jun. 19, 2015, Retrieved from the Internet: http://www.bbc.com/news/business-33184207?utm_source=ti01&utm_medium=&utm_campaign=post%2Binventory. (retrieved on Dec. 1, 2016.).

Liu, Bing. "Bing Liu (Liu, Bing)'s Home Page." Bing Liu (Liu, Bing)'s Home Page, 2008, Retrieved from the Internet: https://www.cs.uic.edu/~liub/FBS/fake-reviews.html. (retrieved on Dec. 1, 2016.).

Grubbs, Michael. "POS 2.0 vs Traditional POS [Infographic]." Moblized, Retrieved from the Internet: http://www.moblized.com/blog/pos-2-vs-traditional-pos-infographic. (retrieved on Dec. 1, 2016.).

Udayan-Chiechi, Prelini. "Restoring Consumers' Faith in Online Reviews." Restoring Consumers' Faith in Online Reviews | Digital Marketing Magazine, Sep. 2, 2015, Retrieved from the Internet: http://digitalmarketingmagazine.co.uk/articles/restoring-consumers-faith-in-online-reviews/.VebzY3TnpbA.twitter. (retrieved on Dec. 1, 2016.).

"Servy—Restaurant Mystery Dining, Secret Shopping and Private Customer Feedback." Servy—Restaurant Mystery Dining, Secret Shopping and Private Customer Feedback, 2013-2016, Retrieved from the Internet: http://www.servyapp.com/. (retrieved on Dec. 5, 2016.).

Tepper, Fitz. "Servy Raises $800K To Let Restaurants Offer Discounts In Exchange For&Nbsp;Feedback." TechCrunch, Sep. 17, 2015, Retrieved from the Internet: http://techcrunch.com/2015/09/17/servy-raises-800k-to-letrestaurants-offer-discounts-in-exchange-for-feedback/?ncid=rss. (retrieved on Dec. 1, 2016.).

Hall, James. "Tripadvisor Banned from Claiming Its Reviews." The Telegraph, Telegraph Media Group, Feb. 1, 2012, Retrieved from the Internet: http://www.telegraph.co.uk/travel/news/Tripadvisor-banned-from-claiming-its-reviews-arereal.html. (retrieved on Dec. 1, 2016.).

Myles Udland. "Yelp Is in a 'Death Spiral'." Business Insider, Jul. 29, 2015, Retrieved from the Internet: http://www.businessinsider.com/yelp-crashes-after-earnings-chairman-steps-down-2015-7. (retrieved on Dec. 7, 2016.).

Loten, Angus. "Yelp Reviews Brew a Fight Over Free Speech vs. Fairness." The Wall Street Journal, Dow Jones &Amp; Company, Apr. 2, 2014, Retrieved from the Internet: http://www.wsj.com/articles/SB10001424052702303847804579477633444768964. (retrieved on Dec. 1, 2016.).

Anderson, Myles. "Young Consumers Read More Reviews & Are More Likely To Write Reviews." Search Engine Land, Oct. 19, 2015, Retrieved from the Internet: http://searchengineland.com/young-consumers-read-reviews-likely-writereviews-233190?utm_campaign=socialflow&utm_source=twitter&utm_medium=social. (retrieved on Dec. 1, 2016.).

* cited by examiner

SYSTEMS FOR INTEGRATING ONLINE REVIEWS WITH POINT OF SALE (POS) OR EPOS (ELECTRONIC POINT OF SALE) SYSTEM

CROSS-REFERENCE TO RELATED APPLICATIONS

This patent application is a continuation of U.S. patent application Ser. No. 16/827,359, filed Mar. 23, 2020, entitled "Systems for Integrating Online Reviews with Point of Sale (POS) OR EPOS (Electronic Point of Sale) System," which is a continuation of U.S. patent Ser. No. 15/341,431, filed Nov. 2, 2016, entitled "Integrating Online Ratings and Reviews for Businesses with Point of Sale (POS) or EPOS (Electronic Point of Sale) Systems to Increase Integrity and Authenticity," which claims the benefit, under 35 U.S.C. § 119(e), of U.S. Patent Application No. 62/249,420, filed on Nov. 2, 2015, entitled "Integrating Online Ratings and Reviews for Businesses with Point of Sale (POS) or EPOS (Electronic Point of Sale) systems to Increase Integrity and Authenticity," each of which are incorporated herein by reference in their entireties.

TECHNICAL FIELD

The present teachings relate generally to the buying and selling of products and services and, more particularly, to systems and methods for facilitating reviews made by customers who have purchased a product or service.

BACKGROUND

Systems for providing customer reviews are known (e.g., YELP®, GOOGLE®, etc.). However, there is a problem with known systems in that it is estimated that approximately 30% of product reviews are fake. It is also estimated that 10-20% of restaurant and hotel reviews are fake. With known systems, anyone can leave a review for a business without ever having a transaction take place with the business.

In addition, it is estimated that 66% of consumers are heavily influenced by online reviews. It is also estimated that 83% of consumers highly trust the recommendations of family and friends. Accordingly, consumers are often misled in their purchasing decisions by fake reviews generated using known systems. Retailers have recently attempted to crack down on fake reviews. However, discerning between real reviews and fake reviews is difficult with known systems.

Therefore, it would be beneficial to have an alternative system and method for integrating online ratings and reviews for businesses with point of sale (POS) or EPOS (electronic point of sale) systems to increase integrity and authenticity.

SUMMARY

The needs set forth herein as well as further and other needs and advantages are addressed by the present embodiments, which illustrate solutions and advantages described below.

The present teachings address a number of problems in the prior art by reducing the amount of fake online reviews and increasing consumer trust. In one example, customers are only allowed to write a review for a business if they have actually had a transaction take place with the business (whether physically at the place of business or online via a website or app, etc.). Such a system may integrate with the business's POS (point of sale) or EPOS (electronic point of sale) system and provide a unique code for the transaction to the customer. This may allow a customer to use the unique code to access the system (e.g., by app, website, etc.), thus verifying that a transaction took place before the customer can rate and review the business.

The system of the present embodiment includes, but is not limited to, a server and a point of sale system adapted to complete a transaction between a business and a customer, the point of sale system sending transaction information for the transaction to the server. A code is generated by the server in response to receiving the transaction information, the code associated with the transaction, the server sending the code to the point of sale system. A receipt for the transaction is printed by the point of sale system, the receipt including the code. A user computer is operated by the customer, the user computer having a scanner scanning the receipt to identify the code, the user computer sending the code to the server. The server validates the code received from the user computer to confirm the transaction took place between the customer and the business. A review of the business is created by the customer, the user computer receiving the review and sending the review to the server only after the code has been validated. The server publishes the review to users of the system.

In one example, the user computer comprises a smartphone and the scanner comprises a smartphone camera.

In one example, the user computer comprises an app downloaded onto the user computer, the app receiving the code and sending the code to the server, and the app receiving the review and sending the review to the server.

In one example, the code comprises a plurality of codes. The point of sale system may ask for the number of codes to be generated by the server and the point of sale system may send the number of codes to the server.

In one example, the point of sale system comprises an electronic point of sale system.

In one example, after the review is published the customer receives a discount to be applied to a future transaction with any of the businesses using the system. The discount may comprise an electronic coupon received from the server and stored on the user computer. The discount may not be redeemable with the business, but only redeemable with other participating businesses.

In one example, the customer is provided a discount to be applied to a future transaction after creating a predetermined number of reviews.

In one example, the server validates the code by asking the customer one or more security questions. The one or more security questions may comprise asking the customer to identify the business from a selection of businesses.

In one example, the server publishes the review to a third-party social networking platform where it is shared with contacts of the customer.

An alternative system of the present embodiment includes, but is not limited to, a server and a point of sale system adapted to complete a transaction between a business and a customer, the point of sale system sending transaction information for the transaction to the server. A code is generated by the server in response to receiving the transaction information, the code associated with the transaction, the server sending the code to the point of sale system. A receipt for the transaction is generated by the point of sale system and provided to the customer, the receipt including the code. A user computer is operated by the customer, the user computer receiving the code from the receipt, the user computer sending the code to the server. The server validates the code received from the user computer to confirm the transaction took place between the customer and the business. A review of the business is created by the customer, the user computer receiving the review and sending the review to the server only after the code has been validated.

In one example, the user computer comprises a smartphone having an app installed thereon. The smartphone may have a camera scanning the receipt to identify the code. The app may receive the code from the camera and send the code to the server. The app may receive the review and send the review to the server only after the code has been validated.

In one example, the code comprises a plurality of codes, each of the plurality of codes validated by the server so that a person can create a review of the business.

In one example, the code comprises a plurality of codes, and a number of codes to be generated by the system is automatically determined based on the transaction information.

In one example, the point of sale system sends the receipt electronically to the customer.

In one example, after the review is published the customer receives an electronic coupon to be applied to a future transaction.

In one example, the server validates the code by asking the customer to select the business from a selection of businesses displayed on the user computer.

In one example, the server publishes the review to a third-party social networking platform where it is shared with contacts of the customer.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION

Figure 1:
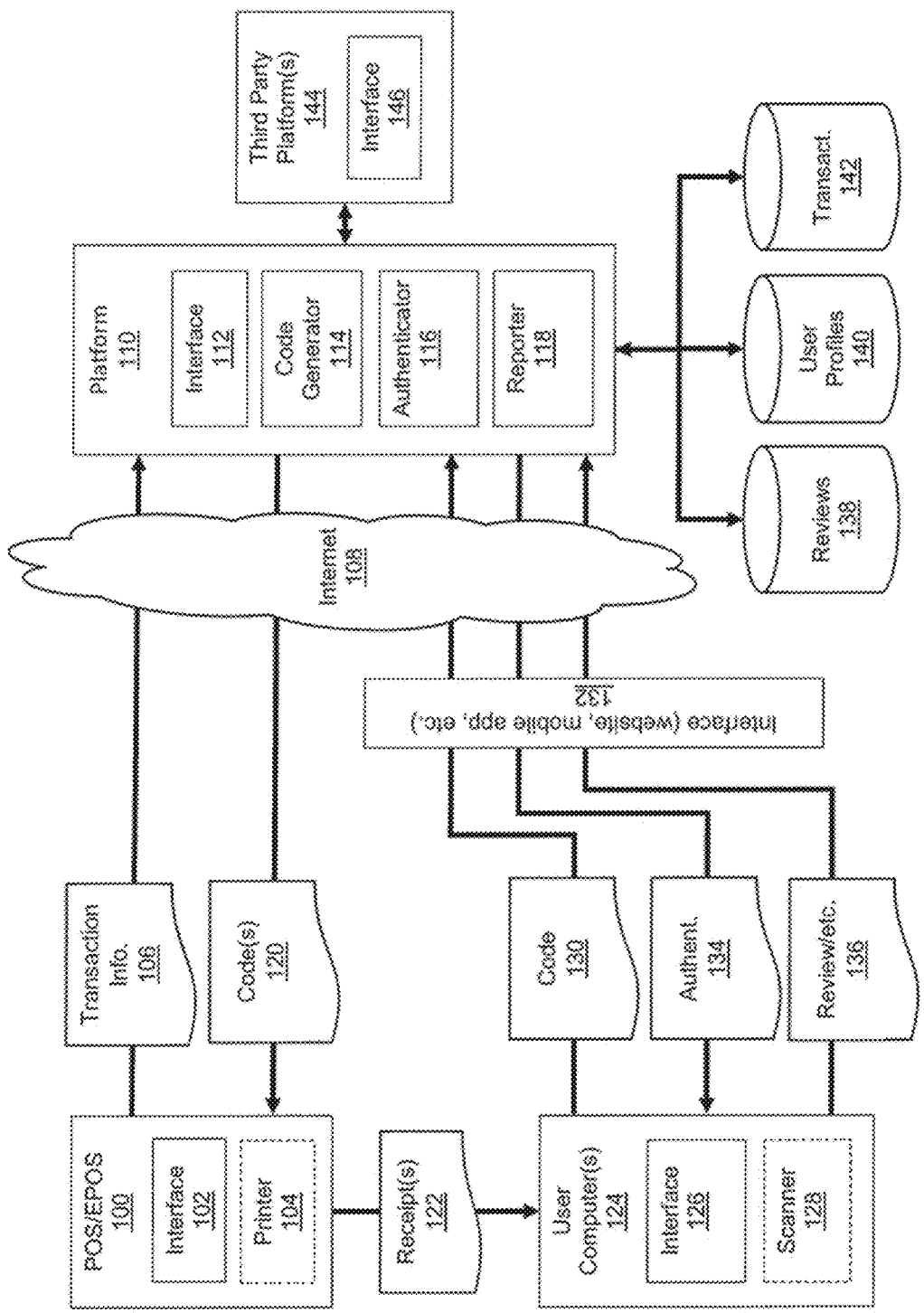
FIG. 1 is a diagram of a system according to the present teachings.

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

The present teachings are directed to addressing the increasing prevalence of fake customer reviews, many of which are provided through online customer review systems. Accordingly, one goal is to help build trust and transparency between consumers and businesses. Described herein is a customer review system which promotes trust with validated reviews after the purchase of products or services. By also allowing consumers to connect through social networking with friends, family and other like-minded people, an additional layer of trust is created, helping to bring context to customer reviews. This provides consumers with data and information to gain more confidence in purchasing decisions.

In one example according to the present teachings, a transaction takes place (e.g., with POS-integration) and a unique code is generated for the customer (e.g., printed on receipt, emailed to customer, sent to mobile app, etc.). A validated review may then be written using the unique code. This increases integrity of reviews and helps ensure that the person who writes the review was physically at the point of sale (or actually involved in a transaction with a business).

A system according to the present teachings may also add an extra layer of trust with friend/family integration. By utilizing social networking features and integrating with third-party social media platforms (e.g., FACEBOOK®, etc.), users may connect with family and friends. A user may then get alerts (and then be able to view the associated ratings and reviews) when friends or family have reviewed businesses nearby or businesses that they are planning on visiting, although not limited thereto.

As is appreciated by those skilled in the art, the present teachings have applicability to many different industries including restaurants, retail stores, online marketplaces, hotels, transportation providers (e.g., airlines, railways, etc.), healthcare professionals (e.g., doctors, chiropractors, etc.), venues, events, and artists (e.g., concerts, etc.), although not limited thereto.

Referring now to FIG. 1, shown is a system according to the present teachings. The system may have a number of components (e.g., functional modules, etc.) to facilitate its operation and which are shown as block components. Such components may include software executing on computer readable media, and may be separate pieces of software or part of a larger software program. In addition, they may be on a single computer or distributed among multiple computers, as appreciated by one skilled in the art.

One skilled in the art appreciates that a POS 100 may indicate the amount for a transaction, prepare an invoice for the customer (which may be a cash register printout), and indicate the options for the customer to make payment. The POS 100 may then accept payment for the merchant in exchange for goods or after provision of a service. After receiving payment, the merchant may issue a receipt for the transaction, which is usually printed, but is increasingly being dispensed with or sent electronically.

As shown, a point of sale system (e.g., POS, EPOS) 100 may include an interface 102 that may be used to interact with other computers 110, 124 and their respective interfaces 112, 126. The POS 100 may be a conventional system that is retrofitted to communicate with the platform 110 (e.g., server(s)). The POS 100 may calculate the amount owed by a customer for a transaction and send the transaction information 106 to the platform 110 over the Internet 108. For example, transaction information 106 may include goods/services to be purchased, merchant identifier, date/time, customer identifier, payment method, payment amount, etc. In response, a code generator 114 may generate a code 120 and send it to the POS 100.

After receiving the code 120, the POS 100 may generate a receipt 122. The receipt may include the code 120. This way, the customer may have a unique identifier that associates a transaction with the merchant, allowing the platform 110 to verify that the customer actually transacted with the merchant before reviewing the merchant. The POS 100 may include a printer 104 to print the receipt, although it is appreciated that electronic receipts may also be transmitted (e.g., via email) to the customer.

The customer may use a computer 124 to enter the code from the receipt 122 and access the system 110. For example, the computer 124 may be a mobile phone and include a scanner 128 (e.g., camera) to scan the receipt 122. The code may be represented as a barcode, QR code, or an alphanumeric string, although not limited thereto. The scanner 128 may scan a barcode, QR code, or perform character recognition on the alphanumeric string, although not limited thereto. The computer may also be a desktop computer, a tablet, a portable computer, or some similar device, and the user may manually enter the code without the need for a scanner 128.

Access to the system 110 may be facilitated by an interface 132. For example, if the computer 124 is a smartphone the interface 132 may be a mobile app installed on the computer 124. In another example, the interface 132 may be a website, although not limited thereto.

The computer 124 may send the code 130 to the platform 110. An authenticator 116 may determine that the code 130 is authentic. If it is authenticated 134, the platform 110 may provide the ability for a customer using the user computer 124 to review 136 the business that issued the receipt 122. Again, this may be done using interface 132 (e.g., FIGS. 3-9).

Storage may be in electronic communication with the platform 110 for storing reviews 138, user profiles 140 and transaction information 142 (e.g., codes, etc.). User profiles may include social networking profiles stored on the system 110.

The system 110 may also integrate/communicate with third-party social networking platforms 144 and respective interfaces 146.

A reporter 118 may provide reporting functionality on reviews and demographics of reviewers, although not limited thereto.

Figure 2A:
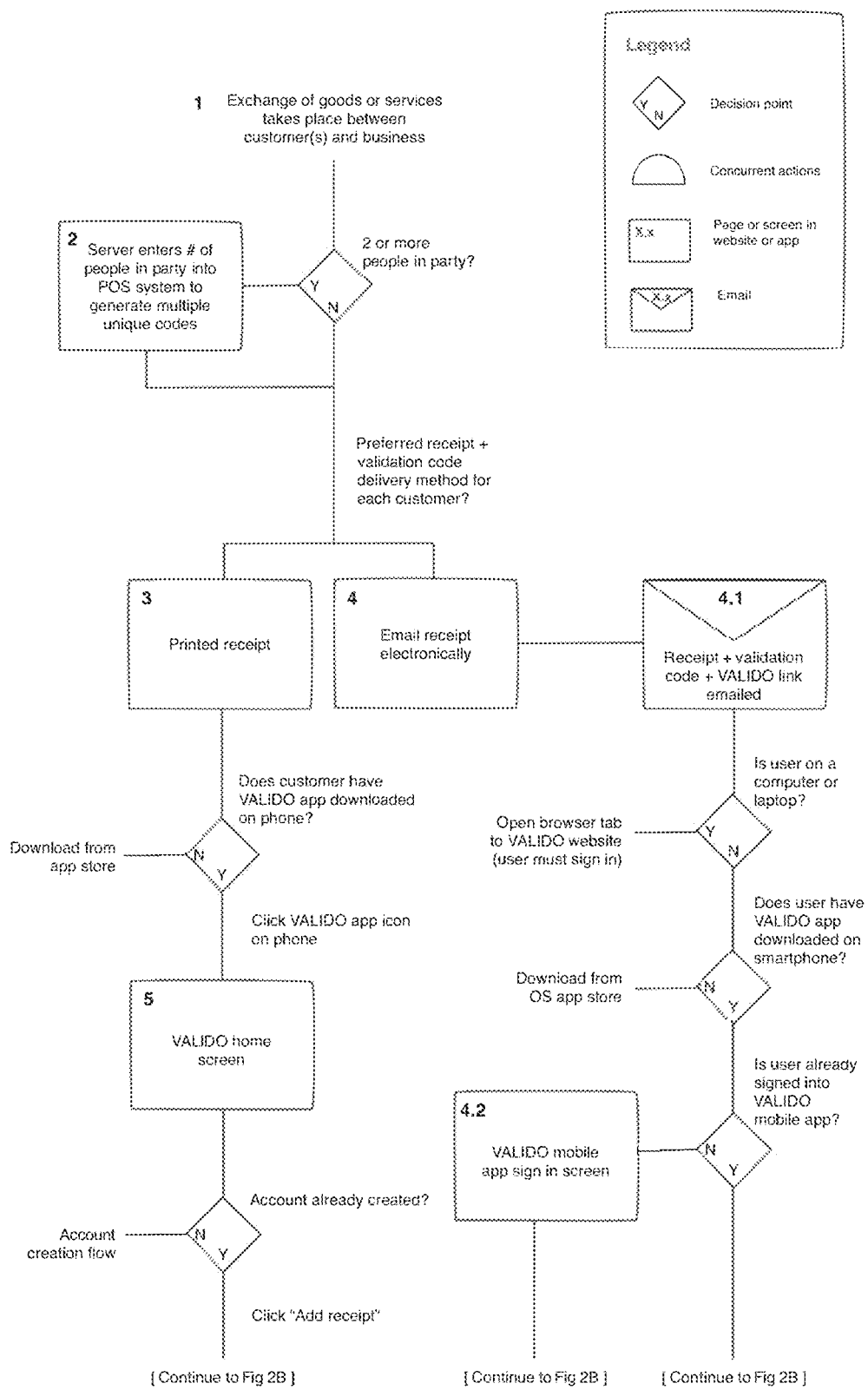
FIGS. 2A-2C depict a flowchart of a method for using the system of FIG. 1.
Figure 2B:
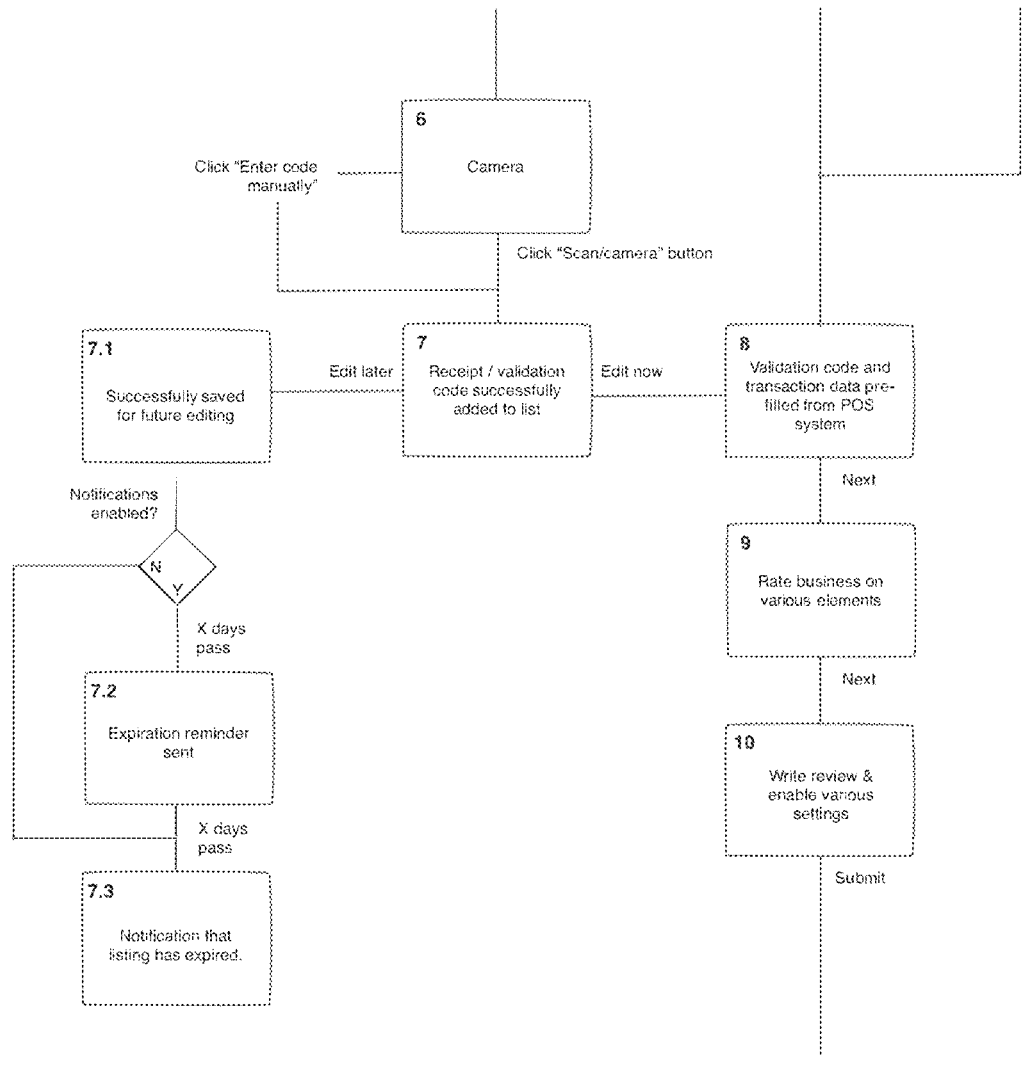
Figure 2C:
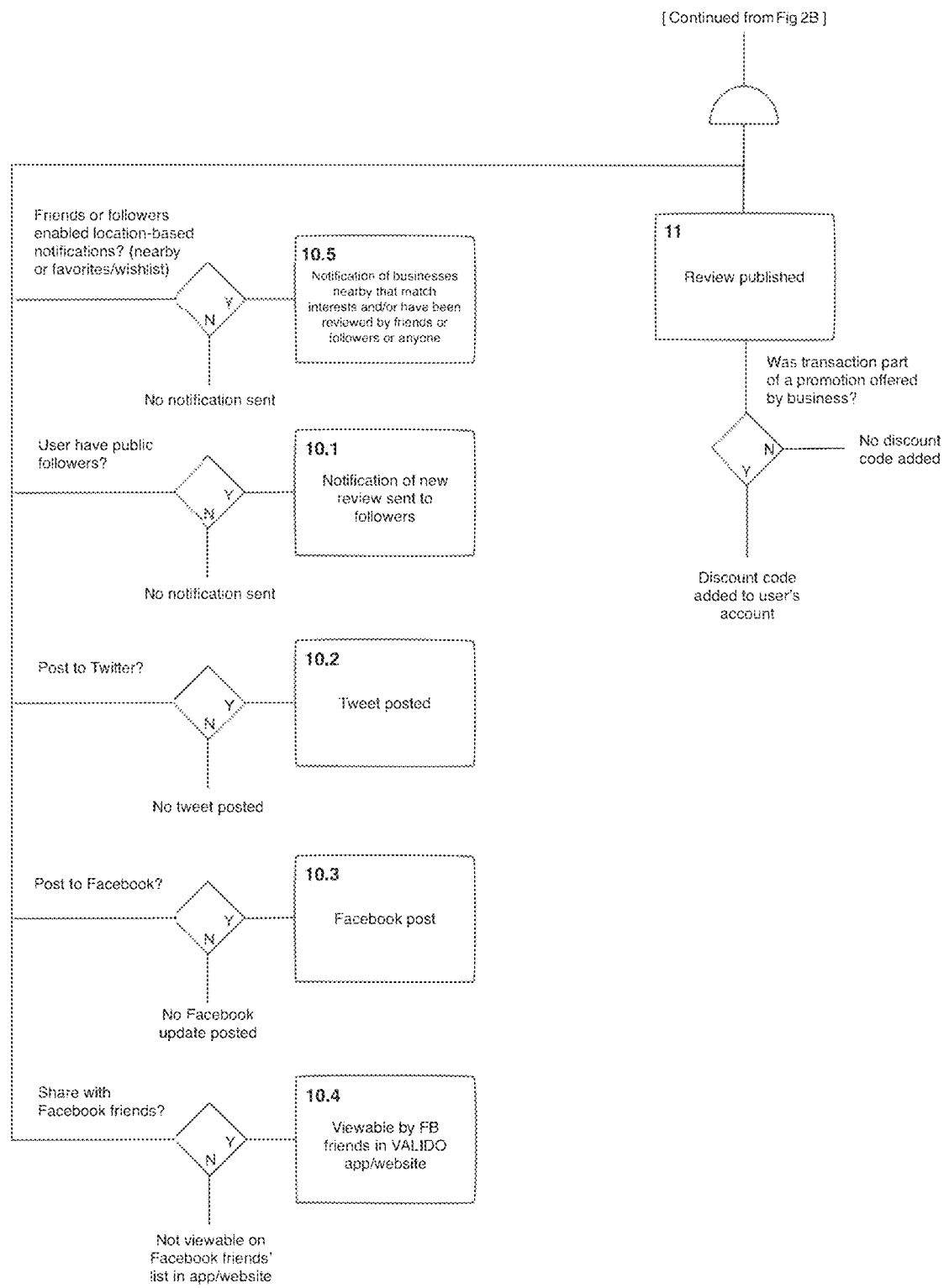

Referring now to FIGS. 2A-2C, shown is a flowchart of a method for using the system of FIG. 1. In step 1, an exchange of goods and/or services takes place between a customer and a business. This exchange could be in person at the business or virtually through a website or mobile app, although not limited thereto.

In step 2, the system may generate unique validation code(s). In the case of a restaurant, for example, if the party includes more than one person, the POS may ask if each person would like to leave a review. In such a way, if there are three people dining together, a single transaction could be split into three different unique validation codes as follows: 123456-1, 123456-2 and 123456-3.

Such a system gives all customers in the group the chance to leave their feedback/review for the business, while still allowing the group to pay from one single bill (e.g., via one person's credit card). The POS/EPOS system can also have the option of associating each separate validation code with a portion of the total bill, if desired. In one example, the system may automatically determine how many unique codes to generate. This may be based on the products or services purchased (e.g., three entrees on a restaurant bill may result in three unique codes, etc.).

The system may ask the preferred delivery method for the unique code(s). In step 3, one or more receipts may be printed (or emailed if the customer chooses that delivery method, etc.) with the unique validation code(s). Such codes verify that the customer(s) did actually buy a good or service from the business. This transaction code may be displayed on the printed receipt that the POS (Point of Sale) or EPOS (Electronic Point of Sale) system generates. The code(s) may be tied to all other data for the transaction that the business has set up in their POS or EPOS, including, but not limited to, business name, date, time, location, server, merchant ID, terminal ID, batch, invoice number, authorization code, sale amount, payment method & info, etc.

If the user is using a mobile device, the system may first determine whether an app has been downloaded to the device. If not, the user may be prompted to download the app in order to facilitate interaction with the system.

In step 5, the user may use the printed code(s) to access the system (e.g., by mobile app, website, etc.). The system may also ask if the user already has an account. If so, the user may be prompted to log in using their credentials (e.g., username, password, etc.). If not, a new account may be set up.

In step 6, code validation may be facilitated by using a camera to scan the printed receipt (e.g., with unique code, barcode, QR code, etc.). The system may interface with the user's mobile device and interact with the camera so that the camera can scan the receipt. The unique code may also be entered manually. In step 7, once the code is recognized (validated) the associated receipt may be added to the user's account.

In an alternative to a printed receipt, in step 4 the code(s) may be received via electronic communication (e.g., email, messaging, etc.). Depending on the type of POS system (e.g., (PAYMENT®, BINDO®, TOUCHBISTRO® TOUCHSUITE®, CLOVER®, etc.) or EPOS system (e.g., SHOPIFY®, SQUARE®, etc.), the customer may have the option to receive their code (and even receipt) via email, although not limited thereto. One skilled in the art appreciates the various POS and EPOS systems available, and how the present teachings may be integrated to address problems with the prior art.

In step 4.1, if a customer chooses to receive the unique transaction code (e.g., may include receipt) via email (or some other communication preference such as messaging, etc.), he or she may receive an email that contains instructions (e.g., unique URL, etc.) to access the system (e.g., open a website, open mobile app installed on device, etc.) (step 4.2).

If the user is on a mobile device, such as a smartphone or tablet, and the user already has the mobile app installed when the link is clicked, the mobile app may be automatically opened and transaction information pre-filled using the unique transaction code (e.g., date/time, merchant, transaction amount, etc.). If the user does not have the mobile app installed, the user's relevant mobile app store (e.g., APPLE APP STORE®, GOOGLE PLAY®, etc.) may open the mobile app download screen.

After the system is accessed (e.g., user installs the mobile app and completes the setup, etc.), the unique validation code and information associated with the transaction may be pre-filled (step 8). This may include putting the information in a "pending reviews" section of the user interface. The user can then choose to rate the business, write a review, and publish it, although not limited thereto. The user can also choose to finish writing the review at a later point.

According to step 7.1, transactions may be saved for future reference. Notifications may be enabled and in step 7.2 reminders may be sent to write a review.

The user having been validated as having transacted with the business, using a code from either via a printed receipt (step 3) or electronic receipt (step 4), the user in step 9 may rate the business. In step 10, the user may write a review and enable various settings.

Once the user submits the review it may be published in step 11. Publishing may include publishing to the user's profile on the system, to third-party social networking accounts (e.g., FACEBOOK®, etc.), to the business's profile on the system, or to the business's third-party profile (e.g., YELP®, GOOGLE®, etc.), although not limited thereto. Where a review is published and whether it is made anonymous may depend on the various settings enabled by the user. However, in one example the business may always see the data anonymously. The user may be able to control anonymity so that, for example, while the business may not be able to identify the user, the user's friends and family on third-party networking platforms may be able to identify the user. One skilled on the art appreciates the various settings the user may make.

If the transaction is eligible for a promotion by the business, a discount may be added to the user's account. Businesses may enroll to offer customers the opportunity for a future discount if they leave a review. For example, ABC Coffee Shop could promote on its website or via a physical sign in its window "Come in, enjoy a cup of a coffee, leave a review and receive X % off on your next visit to any participating business." This encourages reviews while at the same time allowing businesses to acquire new customers. The discount may then be redeemed by the customer at any participating business on the system. The discount may be supplied as an electronic coupon (e.g., barcode, QR code, etc.) that can be scanned by the participating business's POS/EPOS.

In one example, businesses will have their own interface within the system that connects to/talks to the POS/EPOS systems. This may allow them not only to manage their profile, but to schedule and manage promotions on the system.

In step 10.1, notifications of the user's review may be provided to friends/family (e.g., or "followers," etc.). Notifications may be based on whether followers are "public," although not limited thereto. In step 10.5, notifications may include identifying businesses nearby that match interests (e.g., depending on proximity to the business using geolocation, etc.) and/or have been reviewed by others.

One skilled in the art appreciates the integration provided with third-party networking platforms. For example, in step 10.2 a tweet may be posted to TWITTER®. This may include the user's account, the business's account, or another account, dependent upon user settings. In step 10.3, a FACEBOOK® post may be made, again to any of a number of different account feeds (e.g., user, business, etc.). In addition, according to step 10.4, the system maintains its own social networking platform for posting reviews and can be shared with the user's contacts on the system (e.g., via website, mobile app, etc.).

Such a system encourages verified reviews and creates a database of user purchasing history and business reviews/ratings. This creates a wealth of valuable information for marketing and other purposes, and third-parties may integrate with the system in order to obtain this information, in batch updates or via real-time streaming (e.g., reporter 118 in FIG. 1). It is to be appreciated that businesses and others may subscribe to specific business or industry areas in order to be alerted about particular reviews (e.g., may be based on whether review was really good, really bad, involved a large purchase, or by some demographics, although not limited thereto). A dashboard may allow subscribers to log on to the system (e.g., website, mobile app, etc.) in order to filter and sort ratings/reviews by any number of transaction, rating, or demographic attributes.

Figure 3:
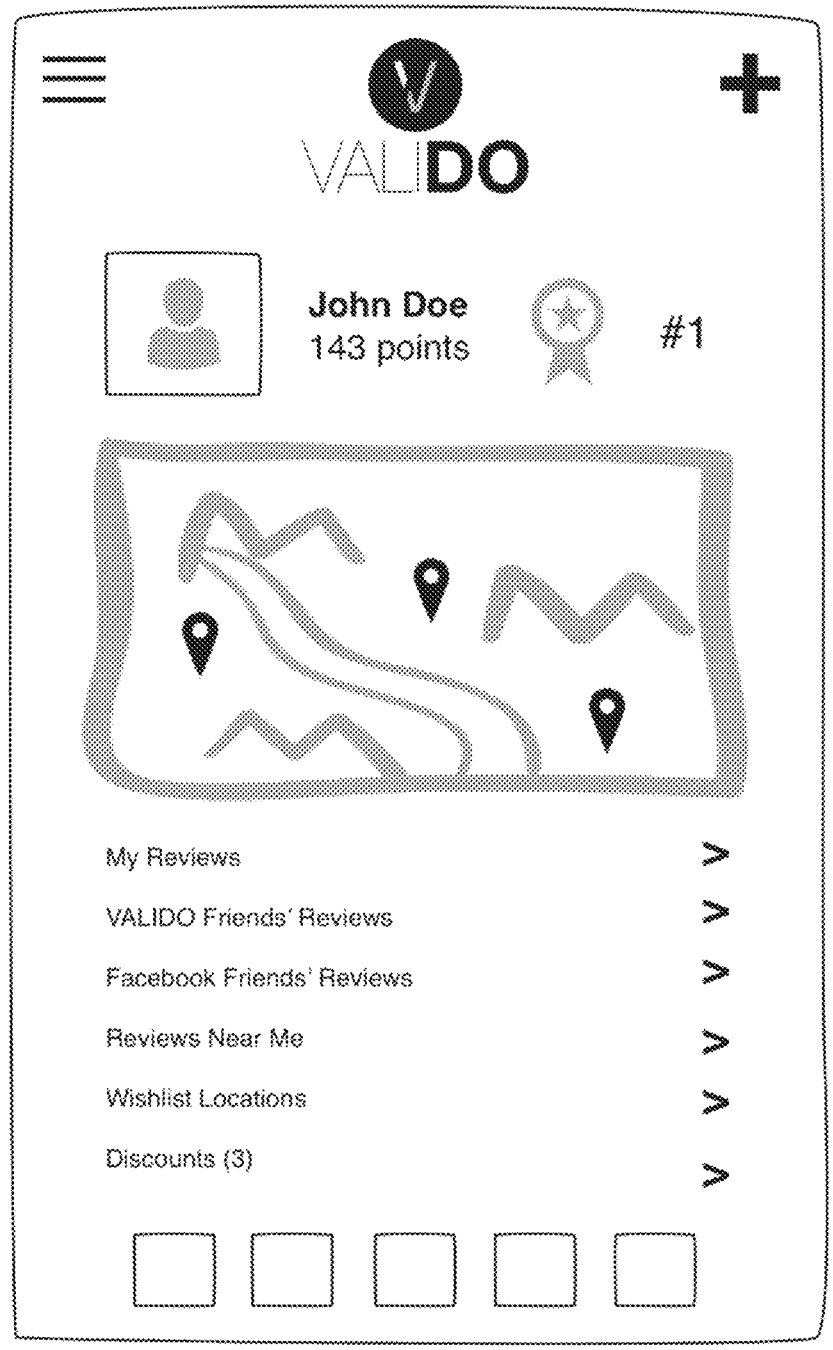
FIGS. 3-9 are example screenshots of functionality described in FIGS. 2A-2C.

Referring now to FIGS. 3-9, shown are exemplary screenshots of a mobile app (or website or other application) according to the system of FIG. 1 and described in FIGS. 2A-2C (icons made by Freepik from www.flaticon.com). Shown in FIG. 3 is a home screen that a user may encounter when logged into the system (e.g., corresponding to step 5 in FIGS. 2A-2C).

Figure 4:
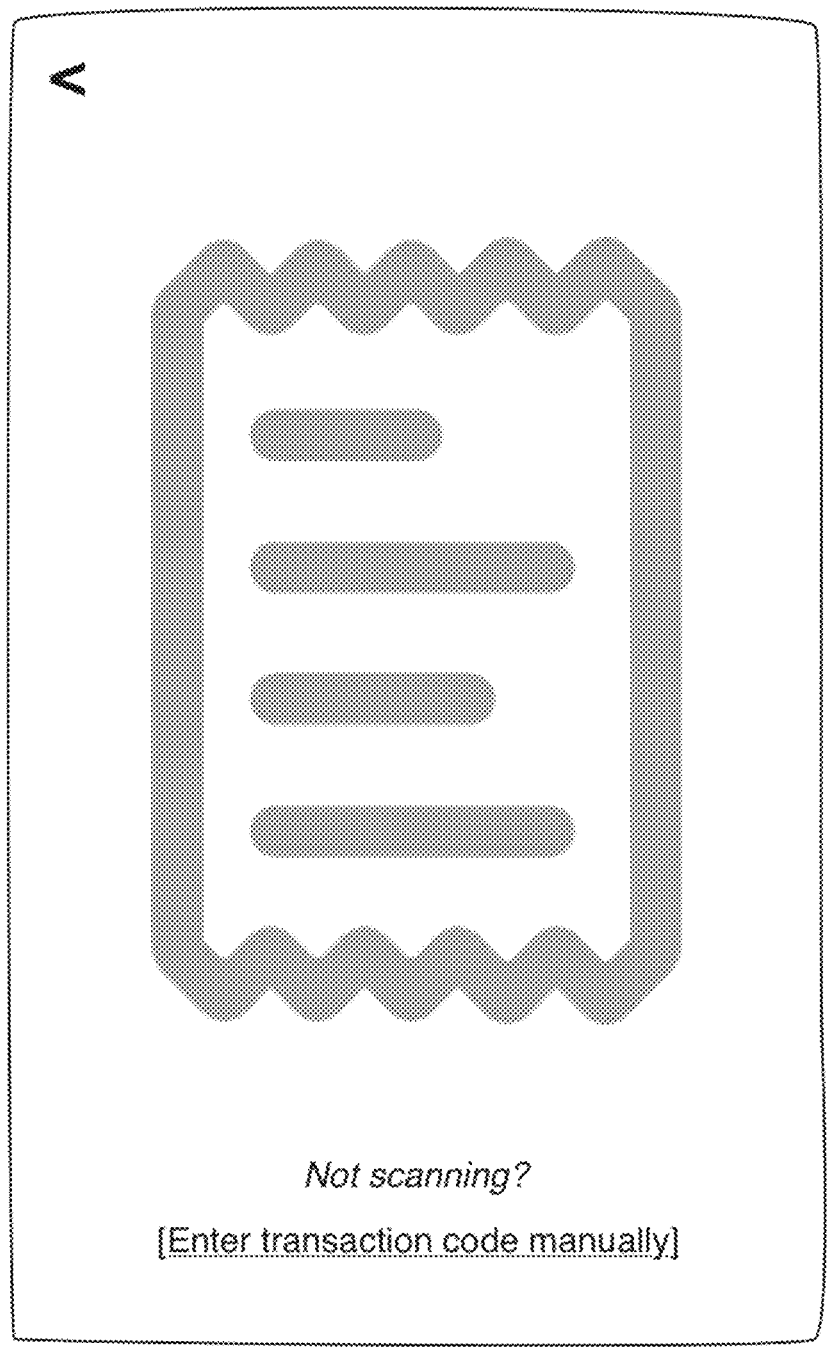

FIG. 4 shows scanner functionality (e.g., corresponding to step 6 in FIGS. 2A-2C). The user may add a receipt to his/her account by using a mobile device's camera to scan the receipt. Depending on the type of POS/EPOS system, this may involve scanning a barcode, a QR code, or allowing the smartphone's camera to scan and read (e.g., optical character recognition) the information from the receipt, although not limited thereto.

In another example, near field communication may be used to communicate information (e.g., the code, etc.) between the user and the POS system. For example, a system such as APPLE PAY® may be used to "beam" information wirelessly to a customer's device. In another example, AIRDROP® technology may be used, although not limited thereto. What is important and understood by one skilled in the art is to be able to communicate information effectively between the user and the POS system. In one example, customers may "check in" to a table number or seat number, or electronically receive a ticket number for a line (e.g., like a deli number). This could be done with inside geolocation data that's been set up by the business. The POS may then associate the bill to that table number (or ticket number, etc.) and wirelessly beam it to the customer's phone or associated system account, although not limited thereto.

Figure 5:
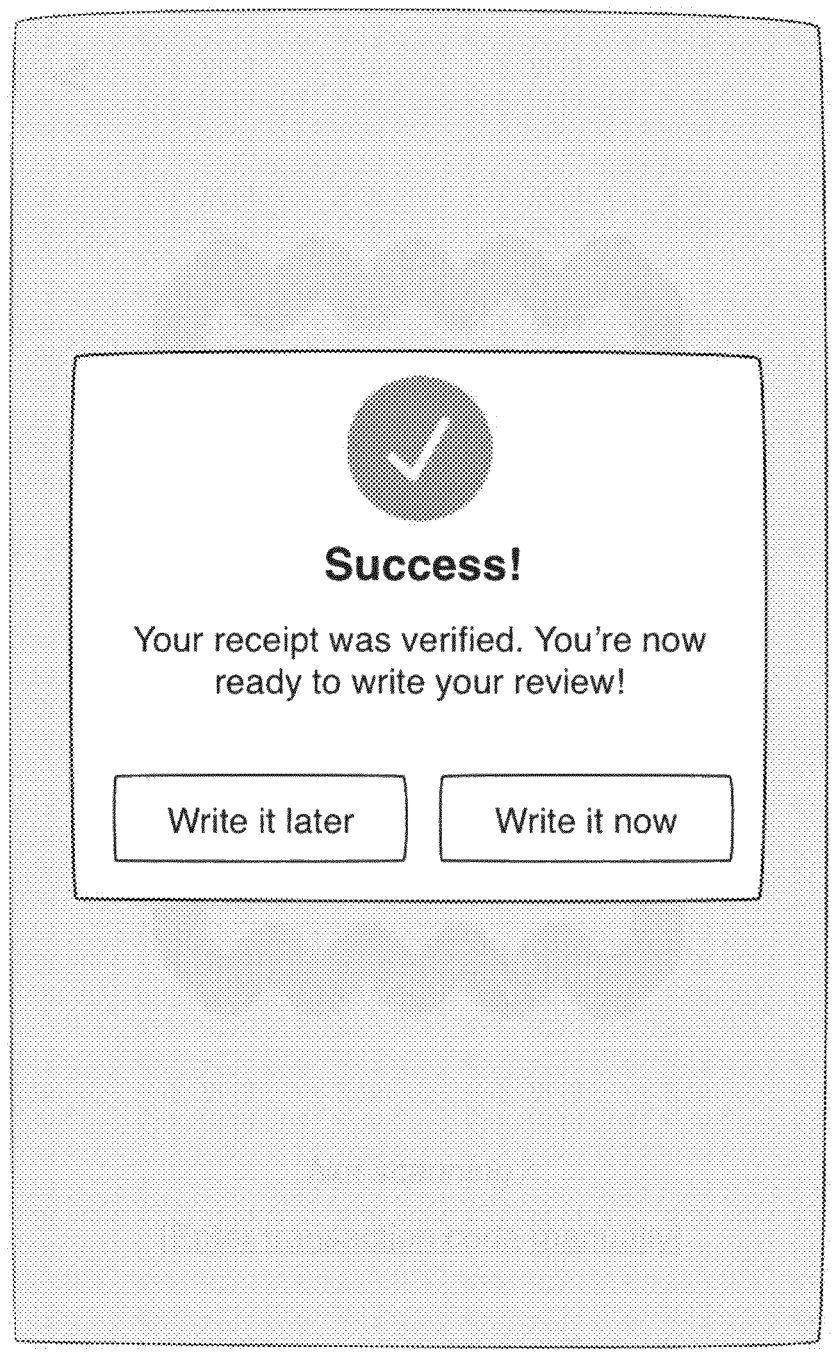

FIG. 5 shows the receipt added successfully (e.g., corresponding to step 7 in FIGS. 2A-2C). The user has been verified and may now write a review for the transaction or come back to it later.

Figure 6:
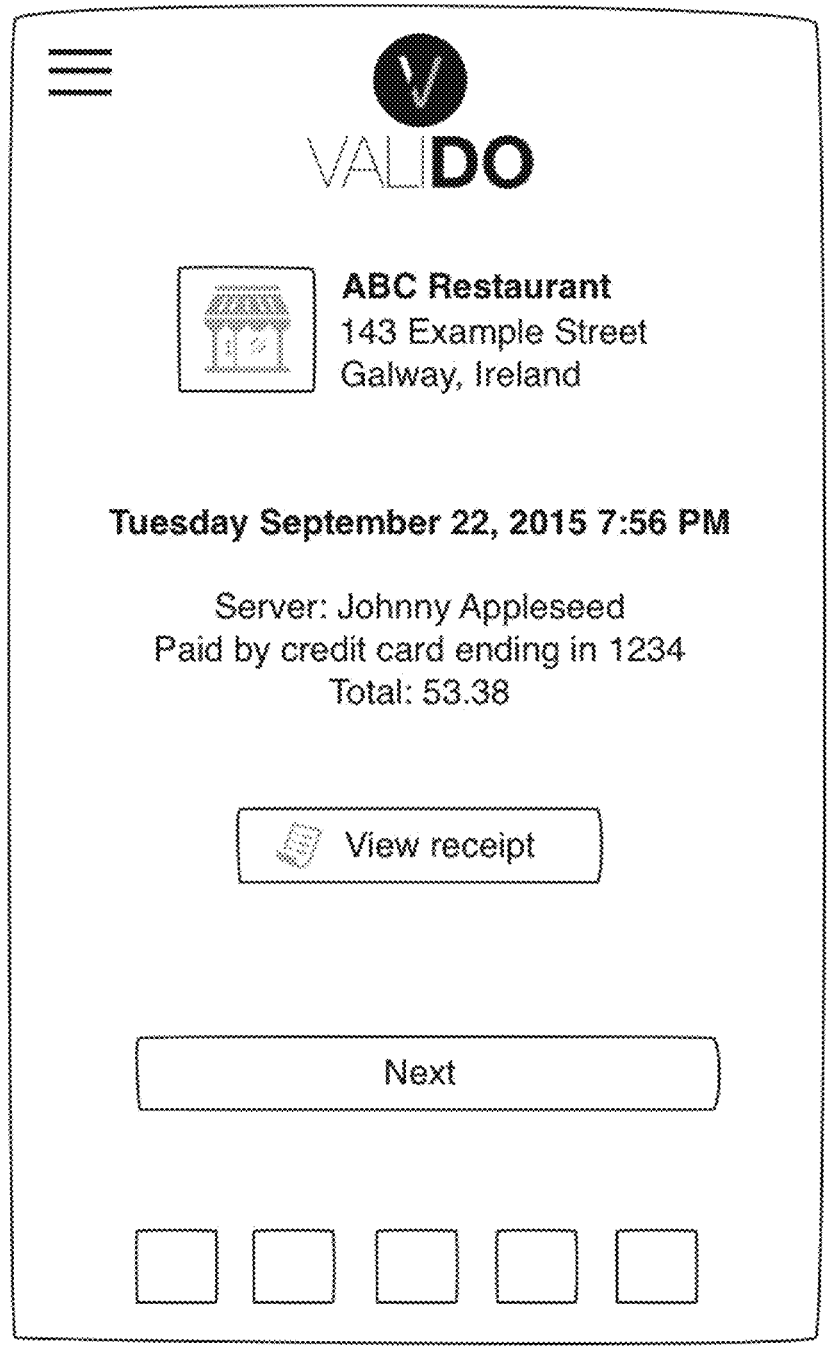

FIG. 6 shows the verified transaction data pre-filled from the POS/EPOS (e.g., corresponding to step 8 in FIGS. 2A-2C). The user may also have the option of viewing the receipt.

Figure 7:
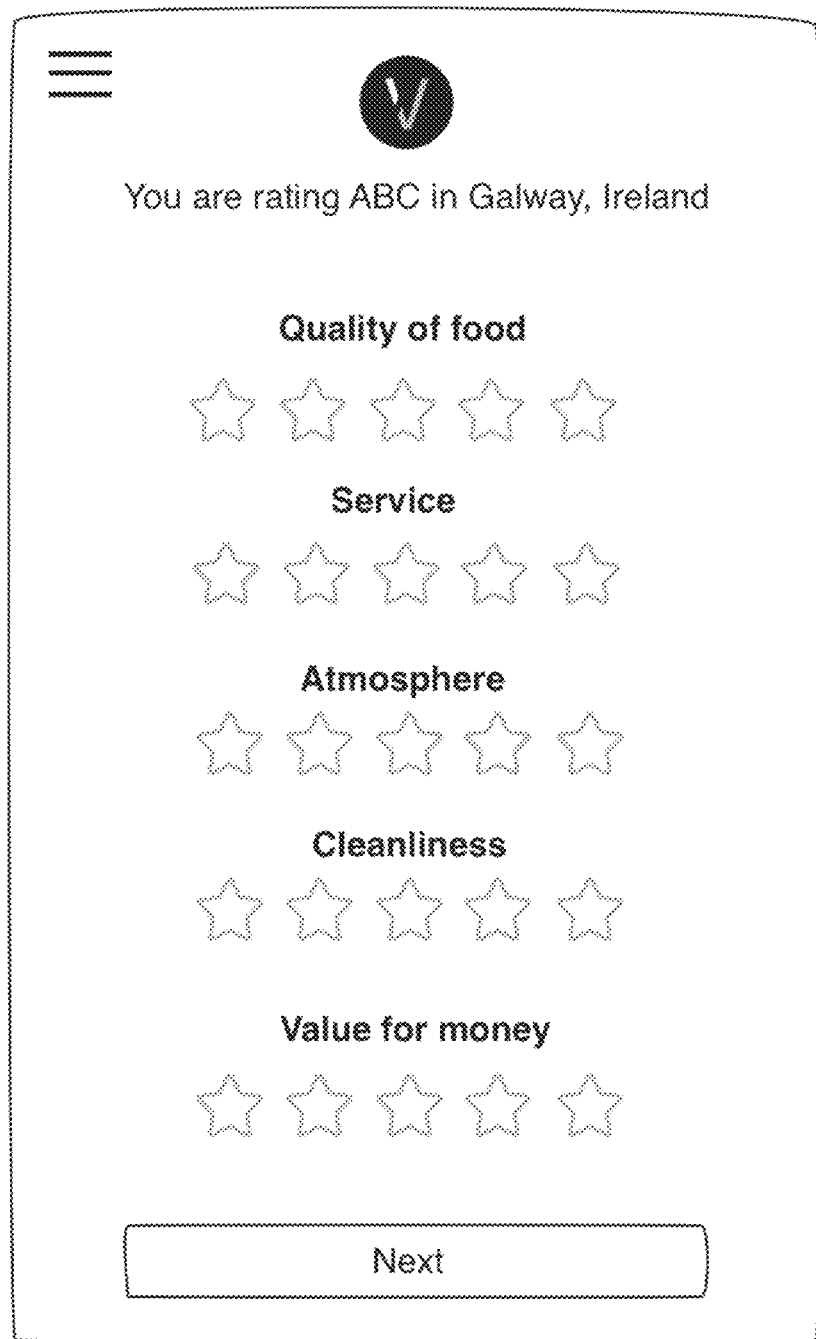

FIG. 7 shows the ability to rate the business on various elements of experience (e.g., corresponding to step 9 in FIGS. 2A-2C).

Figure 8:
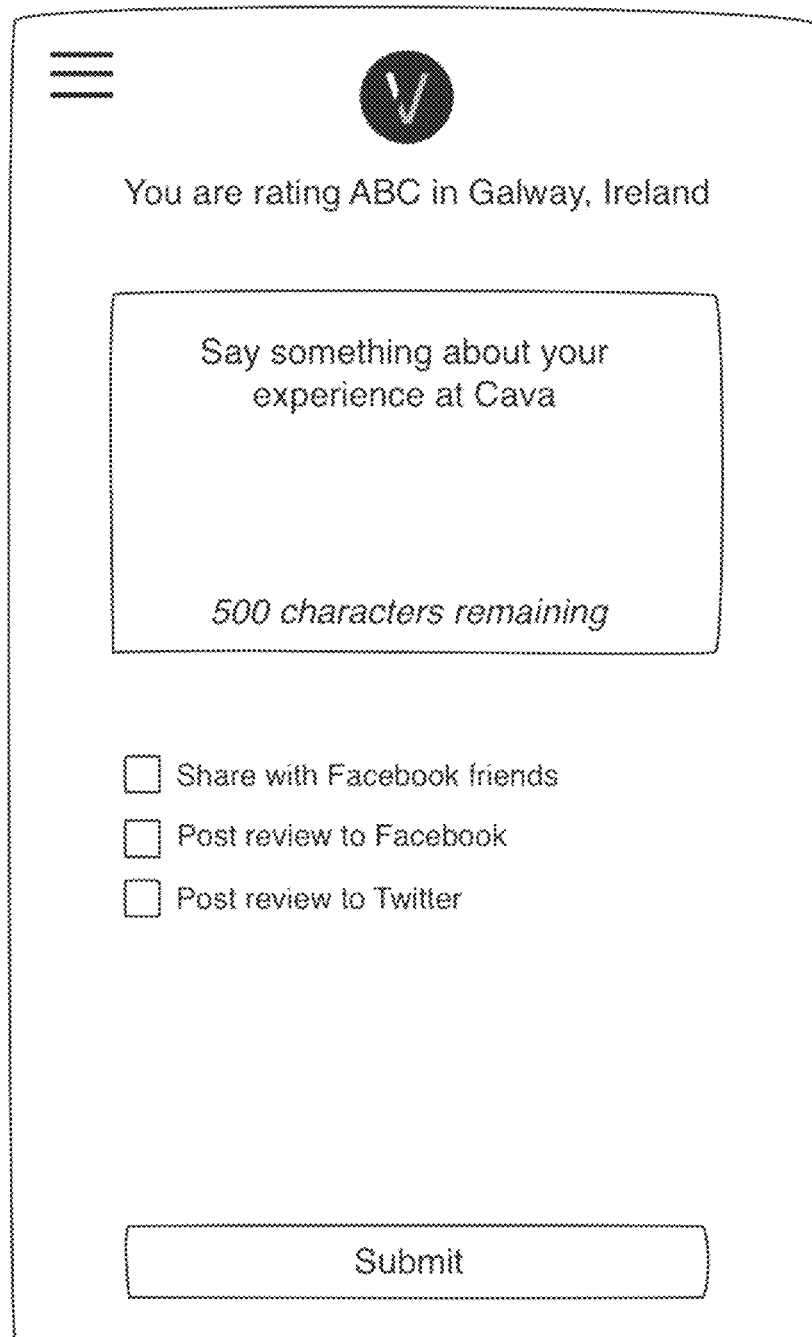

FIG. 8 shows the ability to write a review and gives options to enable various settings (e.g., corresponding to step 10 in FIGS. 2A-2C).

Figure 9:
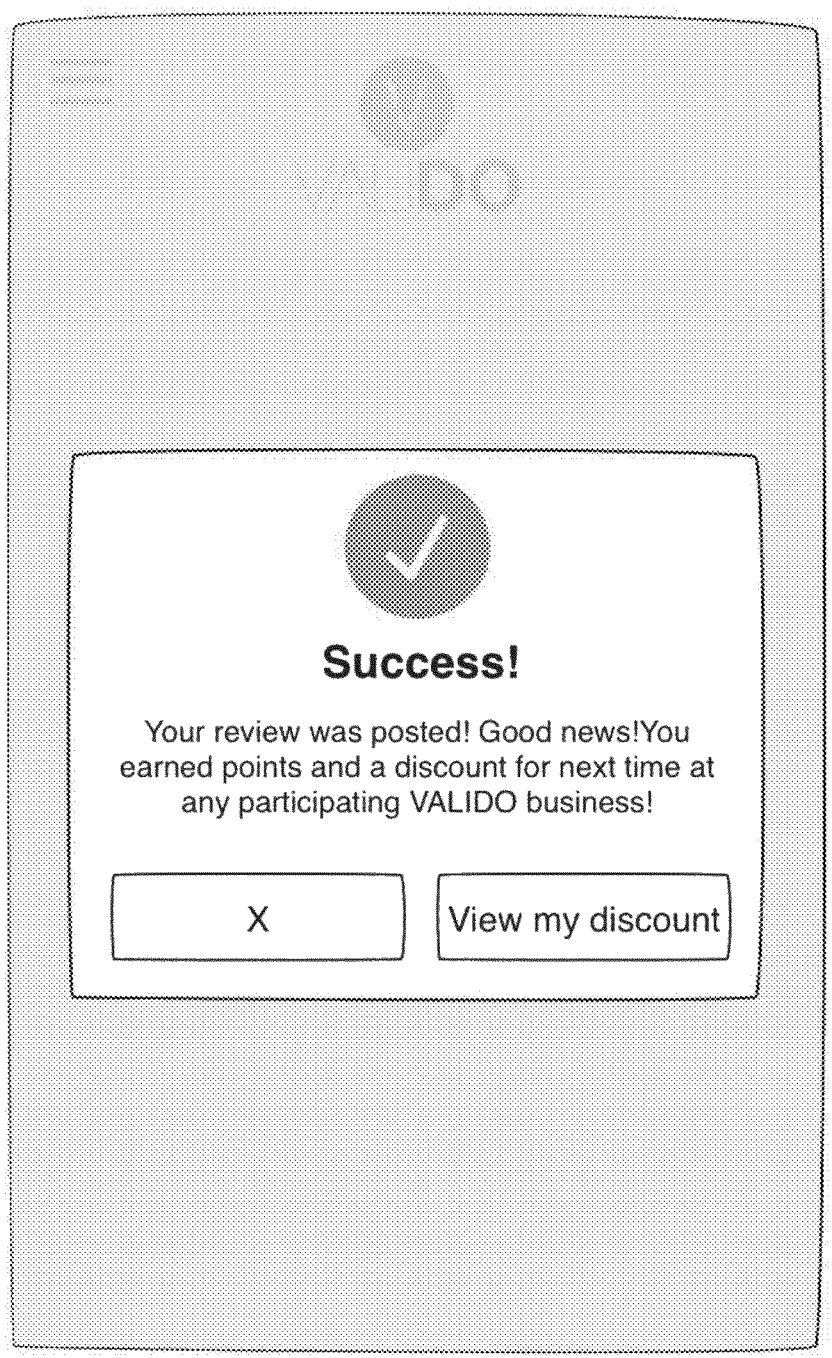

FIG. 9 shows the ability to post a review (e.g., corresponding to step 11 in FIGS. 2A-2C). The user may also have the option of viewing any discount they earned by rating/reviewing the business.

A system according to the present teachings builds trust in the review process. Customer reviews mean more when they come from family, friends and other like-minded people. The transaction-based and point of sale (POS/EPOS) system integration ensure that only verified reviews may be written. The user interface provides a user-friendly system to rate businesses and write a validated review, proving that a transaction took place. Users can also get rewarded so they can enjoy exclusive opportunities for sales and discounts at favorite businesses.

A loyalty program may be offered to users to encourage the submission of reviews. For example, after a predetermined number of reviews (e.g., every 5th review), the user may receive a coupon code to redeem at any participating business. In one example, the coupon may not work for businesses the user has already reviewed. This way, in case the business received bad reviews, it gives them an incentive to fix the problems and it also gives customers the opportunity to try different businesses, giving other businesses the chance to gain new customers and entices them to become a participating business.

The system may also provide ways of reducing the chances that a validation code can be guessed and entered manually. For example, the system may ask one or more "security questions" once the validation code is entered. Such questions may include details about the transaction that most likely only the customer would know. For example, the system may ask "What restaurant are you trying to review?" and give choices or ask the user to enter the answer in manually.

Figure 10:
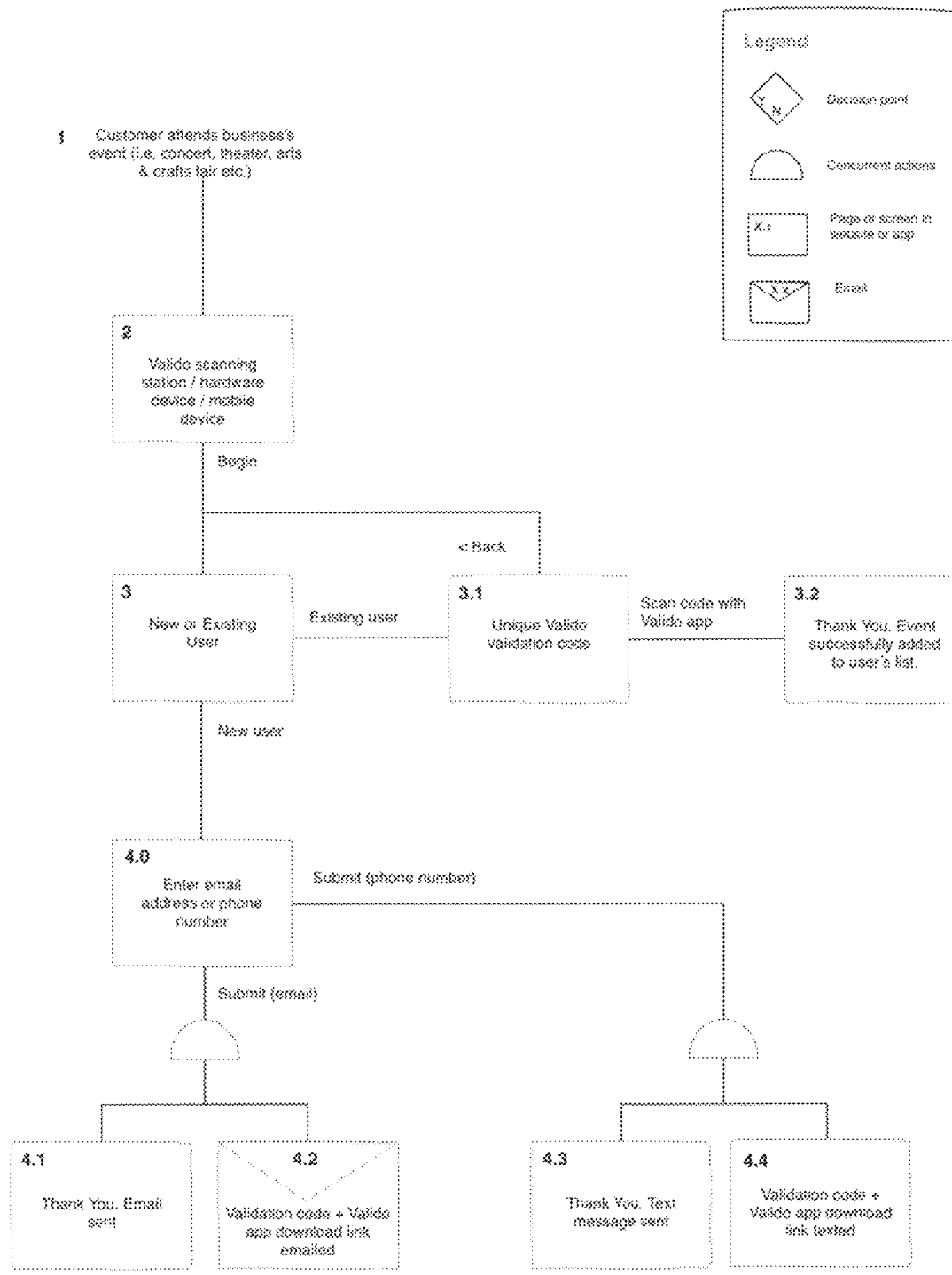
FIG. 10 is another flowchart of a method for using the system of FIG. 1.

Referring now to FIG. 10, shown is another flowchart of a method for using the system of FIG. 1. In step 1, a customer attends an event by the business (e.g., concert, theater, arts & crafts fair, etc.). The business may provide a scanning station (e.g., computer terminal, tablet, mobile phone, etc.) (step 2). In step 3, the customer may be asked if they already have an account on the system. If so, the user may be given a code (step 3.1) that is added to their account (e.g., pending reviews as discussed above, event list, etc.) (step 3.2). If not, the user may enter user information (step 4), which may include a phone number and email address, although not limited thereto. The system may send a thank you email (step 4.1) and/or message text (step 4.3). The system may also may send a code to the user by email (step 4.2) or text (step 4.4), although not limited thereto.

Referring now to FIGS. 11-16, shown are exemplary screenshots of a mobile app (or website or other application) according to the system of FIG. 1 and described in FIG. 10.

A customer may attend an event (e.g., pre-pay, buy ticket(s) at the door, etc.) (e.g., corresponding to step 1 in FIG. 10). At events with large amounts of people, for example, customers can scan their phones at "scanning stations" to validate they actually attended the event. This may include scanning a code at the event. In an alternative, an event employee may scan a unique user ID associated with the user and shown by the app (e.g., as a barcode, QR code, etc.). In either way, the system can validate that the user attended the event and allow the user to create a validated review (e.g., most likely after the event, etc.) without transaction information or even a POS.

Business employees and/or agents can walk around the event with mobile hardware devices so users can scan and/or enter their user information (e.g., email address, etc.). One skilled in the art appreciates that these teachings could be applied to more than just events, for example, to confirm that a customer was at a restaurant or a store, and then allowing that customer to submit a validated review based on their visit.

The system according to the present teachings may also integrate with ticket sales systems (e.g., TICKETMASTER®, STUBHUB®, etc.). But proving the customer was actually at the event (e.g., since he or she may not be the person who purchased the ticket(s)) may be preferable as tickets are often resold or given away.

The system may also provide the option of allowing customers to connect with others at the event. For example, users may opt in to allow other event-goers to find/add them as a "friend," etc. This may be preferable for connecting like-minded people and/or may be helpful in scenarios where someone lost something or they met a person but never got their name.

Figure 11:
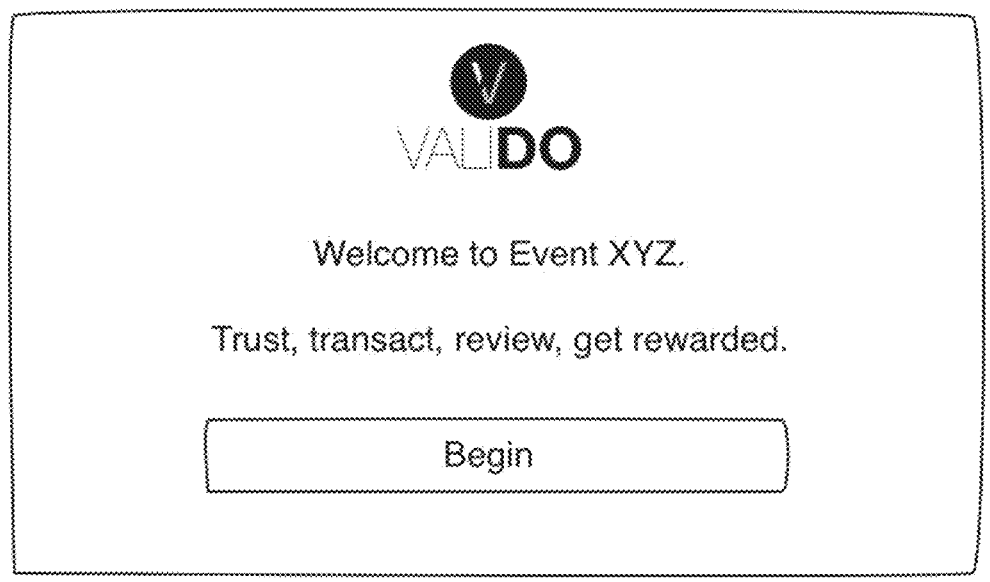
FIGS. 11-16 are example screenshots of the functionality described in FIG. 10.

Shown in FIG. 11 is an example welcome screen on the "scanning station" at the event (or business location, etc.) (e.g., corresponding to step 2 in FIG. 10). Participating businesses may use hardware device(s) (e.g., tablets, IPADS®, laptops, etc.) at their events to validate that users attended the event and allow them to review the event. Such hardware devices can be easily installed/mounted anywhere within the venue. There may be multiple devices, and preferable locations may include areas where long lines of people congregate. In addition to having user's scan a code provided by the business, the business may have the option of using handheld mobile hardware devices that allow venue workers to walk around and scan a unique User ID codes shown by each user's app.

Figure 12:
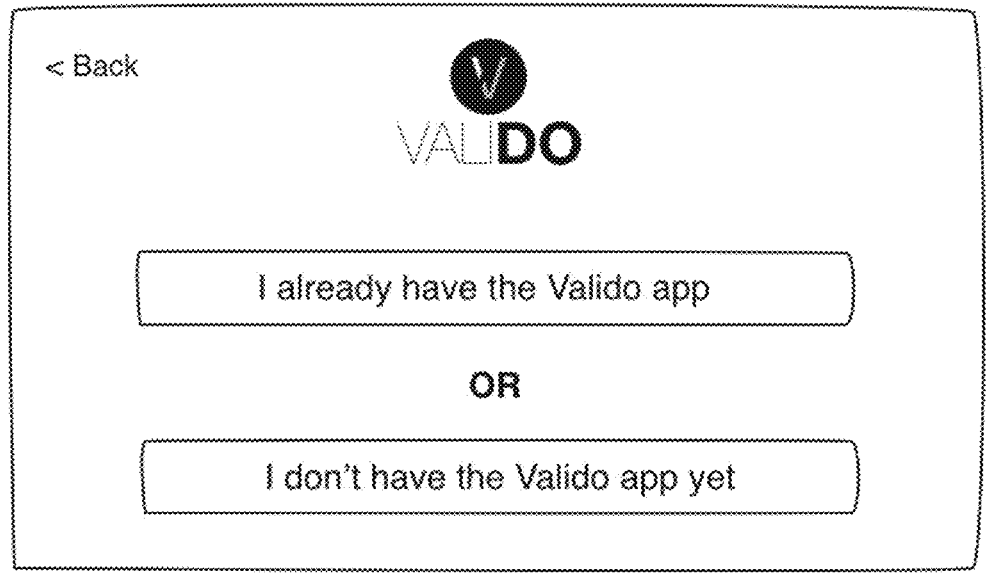

Shown in FIG. 12 is an example screen where users can identify whether they are new or existing users (e.g., corresponding to step 3 in FIG. 10). Existing system users (who already have the mobile app downloaded and have created an account) may click "I already have the app" and new users may click "I don't have the app yet," although not limited thereto. Existing users may be taken to a screen with a unique validation code. New users may be taken to a screen where they can input their email address and/or phone number, although not limited thereto.

Figure 13:

Shown in FIG. 13 is an example screen where existing users are displayed a unique validation code (e.g., corresponding to step 3.1 in FIG. 10). The user may open an app on their mobile device, go to the camera/scan screen and click the scan button to claim/associate that validation code to their user account, proving they were at the event and allowing them to write a review. Most users will likely write a review later on, but they can do it as soon as the validation code is associated to their account. This event will be added to the user's "review list" that displays businesses/venues for which they have been validated, but have not yet written a review for. If a user tries to scan a second unique validation at the same event, an error may be displayed since the user may only be allowed to write one review per event.

Figure 14:
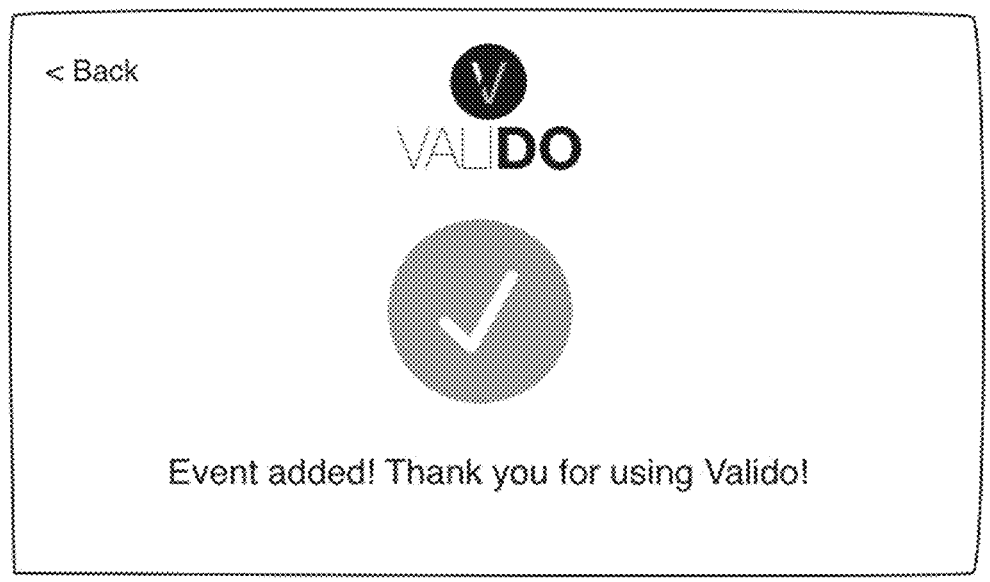

Shown in FIG. 14 is an example screen where an event was successfully added to the user's list (e.g., corresponding to step 3.2 in FIG. 10). Such a success screen may be displayed after the user scans the unique validation code with their app. If the user has already "claimed" a unique code for this event, it may display an error alerting them that there is only one validation code/review per person per event.

Figure 15:

Shown in FIG. 15 is an example screen where new users can enter their user information (e.g., corresponding to step 4 in FIG. 10). New users can enter their email address and/or phone number, although not limited thereto. Upon clicking "Submit", they may receive an email and/or text message with a link to download the app. Once they sign up, the unique validation code associated to this event may be automatically added to their review list.

Figure 16:
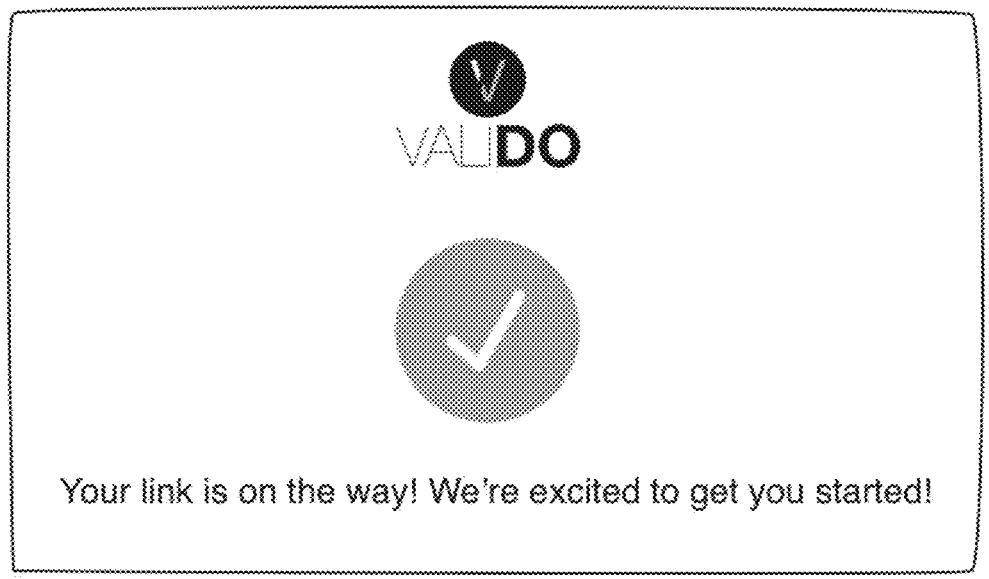

Shown in FIG. 16 is an example screen indicating successful sending of the link to the new user (e.g., corresponding to steps 4.1 and 4.3 in FIG. 10). New users may enter their email address and/or phone number and upon clicking submit they may receive an email and/or text message with a link to download the app. Once they sign up, the unique validation code associated to this event may already be added to their review list.

Figure 17:
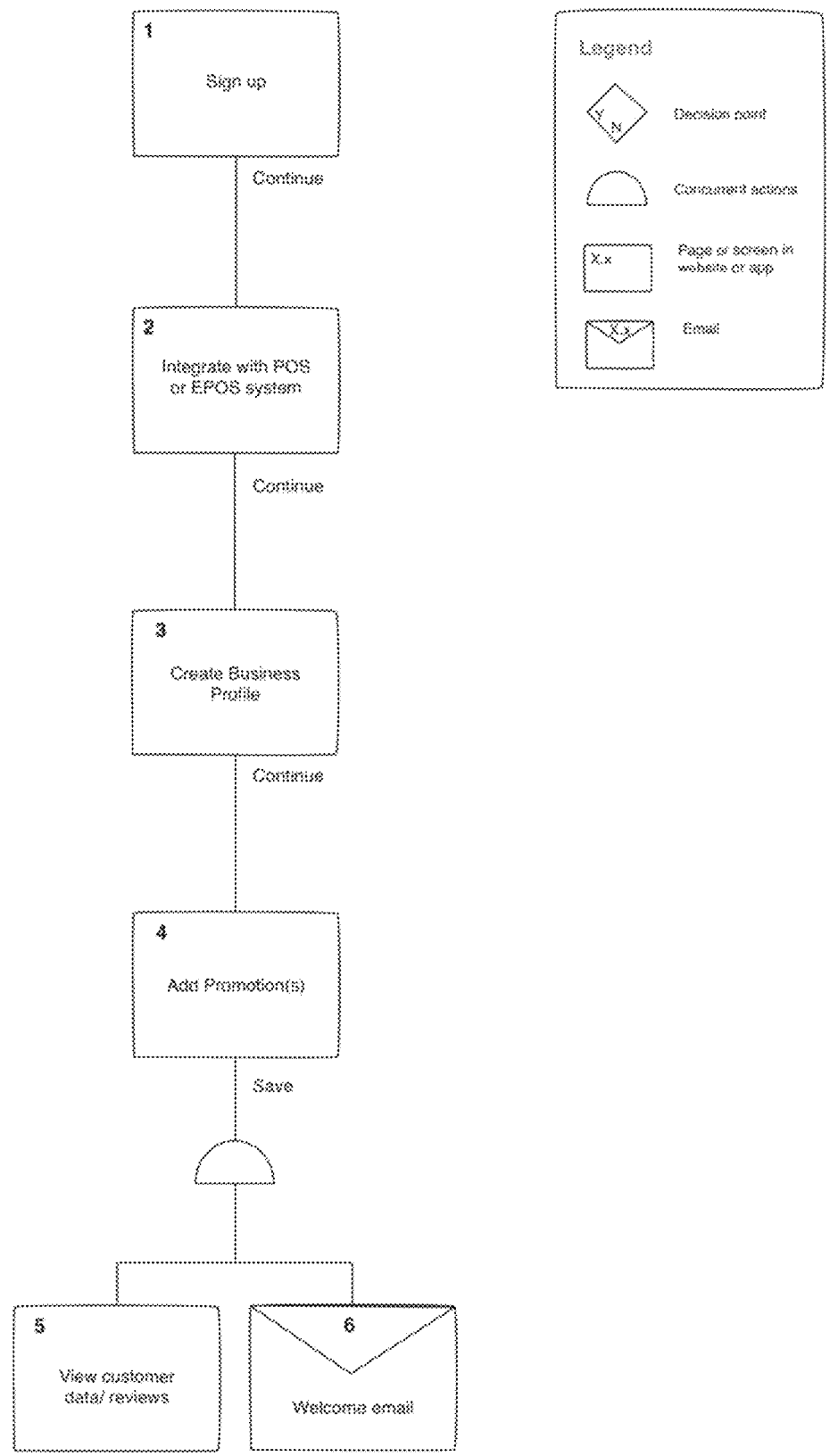
FIG. 17 is another flowchart of a method for using the system of FIG. 1.

Referring now to FIG. 17, shown is another flowchart of a method for using the system of FIG. 1. In step 1, a business may sign up for an account on the system. Various information may be captured, such as business name, business tax ID (e.g., to validate the business actually exists), address and phone number, etc.

In step 2, the system may integrate with the business's POS/EPOS system. The business may enter a unique code to identify their POS or EPOS system (e.g., to authenticate their POS/EPOS system) or may sign in to validate they are indeed the owner of the POS/EPOS system they are claiming to integrate with the system. The business may also have the option of purchasing hardware from the system provider to use at their place of business.

In step 3, the business may create a profile on the system. The business may enter various data to create a profile in the system. Data can include, but is not limited to, business name, address, phone number, description, photos, etc.

In step 4, the business may add promotion(s). The business may choose to create promotions, discounts, deals, etc. to offer to users on the platform. These promotions can be saved for activation later or they can be activated immediately. Each promotion may have various attributes such as a certain % or $ amount off a purchase, and may include an expiration date and/or have other restrictions or benefits.

For example, after a customer writes a review for the business (e.g., regardless if it's positive, neutral or negative), the business may offer a rewards program. The user may still verify they purchased something at the business, but since they previously wrote a review, this may act more like reward card, whereby after purchasing X amount of goods or X purchases/visits, the customer will receive X for free. A coupon code may be added to the user's account, which can later be redeemed by the customer via the POS/EPOS at the business (e.g., by scanning coupon stored for user on app).

The business may also create "flash sales" that are broadcasted out to all system users or only to system users within a certain proximity (e.g., 500 feet, 5 miles, etc.) to the business's location (or users with other attributes to be decided by the business). This may help businesses drive sales during lulls (times where there are not many people purchasing goods or services). The "flash sales" may be activated indefinitely or set for a specific period of time (e.g., hours, days, etc.). They may be cancelled at any time.

In step 5, the business may view customer data, reviews, etc. When the business first signs up as a participating business, there may not be any customer data or reviews yet. Once customers start reviewing the business on the system, the customer data and reviews will be visible for the business to review, analyze and respond (if desired). The customer's name or photo may never be shown to the business, however other important, unidentifiable data may be displayed, such as, but not limited to, gender, age, city, state, country, "persona type" (as defined by the system, based on criteria the user input when creating their profile), etc. Restricting user identifiable information may protect the business relationship and avoid awkward situations where a frequent customer gets to know the business owner (or other employee), but wants to leave some negative (yet helpful) feedback, and does not want to damage the relationship. Customers deserve to have their voice heard (without backlash and awkwardness) and businesses want and need to know about potential issues (so they can address them).

In step 6, the business may receive a welcome email from the system with information on how to access its account and other helpful tips.

One objective of the present teachings is to share reviews with social networks/family/friends (e.g., trusted contacts), however users may also be given the option to read reviews from outside of their network. In such a case, data may be shown anonymously. This may be helpful for people new to the system so they can see reviews since they won't be able to read any reviews yet from their own network/friends/family.

The system may also be an invitation only model. In this case, the only ways a user can sign up for the system is by either physically being at a participating business (or event) where a POS/EPOS can enroll them, transacting with a participating business, or by being invited by an existing user.

A system according to the present teachings may integrate with a mobile operating systems' (e.g., APPLE IOS®, etc.) native QR code reader. In this way, a user can choose to use the QR code reader (or similar technology) on their mobile app's OS to scan a validation code (for example from a printed receipt), which will automatically associate it to the system's app and add the validation code so the user can rate and review the business.

As discussed above, the app (or website, etc.) may provide a unique User ID that can be scanned to identify the user. This may be a code (e.g., barcode, QR code, alphanumeric string) that can be scanned by a POS (e.g., when shown on the user's computer by the app). The system may also provide payment information to the POS if the user has payment information (e.g., checking account, credit card, PAYPAL®, etc.) in their user profile. By identifying the user in this way, the receipt and/or unique code for the transaction may be transmitted by the server directly to the user, without the need to print it on a paper receipt.

The system according to the present teachings may integrate with existing review sites (e.g., GOOGLE®, YELP®, etc.) and provide its reviews as validated reviews to those third-party platforms.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for customer review, comprising:
a point-of-sale (POS) system communicatively coupled to a server, the POS system being configured to:
receive transaction information for a single transaction, the transaction information including a number of people in a group, the group comprising a plurality of people, the number of people being greater than 1;
determine an amount of the single transaction representing a total bill for the group;
determine a number of codes to generate based on the transaction information, the number of codes being greater than 1; and
transmit the amount of the single transaction, the transaction information, and the determined number of codes to generate to the server,
wherein the server is configured to:
in response to receiving the amount of the single transaction, the transaction information, and the number of codes to generate, generate a plurality of customer codes, a number of the plurality of customer codes being equal to the determined number of codes, each generated customer code being unique from one another, each of the generated plurality of customer codes respectively corresponding to different people in the group, and
transmit the generated plurality of customer codes to the POS system, wherein the POS system is further configured to:
in response to receiving the generated plurality of customer codes, generate a single transaction receipt associated with the single transaction, the single transaction receipt including the single transaction amount and the generated plurality of customer codes, each of the generated plurality of customer codes corresponding to different people in the group; and
at least one customer device communicatively coupled to the server, the at least one customer device being configured to:
receive a respective customer code; and
transmit the respective customer code to the server, wherein the server is further configured to:
determine whether the respective customer code is authentic based on the respective customer code being among the generated plurality of customer codes,
in response to determining that the respective customer code is authentic, enable the at least one customer device to provide a review from one person in the group, the one person being associated with the respective customer code, and
receive a respective review corresponding to any of the plurality of customer codes associated with the single transaction.

2. The system of claim 1, wherein the server is further configured to, in response to determining that the respective customer code is authentic, associate the transaction with a user account.

3. The system of claim 2, wherein the server is further configured to transmit a reminder for an unreviewed transaction associated with the user account.

4. The system of claim 2, wherein the server is further configured to, in response to receiving the review associated with the transaction, publish the review.

5. The system of claim 4, wherein the server is further configured to publish the review to a third-party platform.

6. The system of claim 4, wherein the server is further configured to transmit a notification to an individual related to the user account when the individual is within proximity of the POS system.

7. The system of claim 2, wherein the server is further configured to associate a promotion to the user account based on the transaction.

8. The system of claim 7, wherein the server is further configured to associate the promotion to the user account based on a determination of whether the review associated with the transaction has been received.

9. The system of claim 1, wherein at least two of the generated plurality of customer codes are respectively associated with a different person.

10. The system of claim 1, wherein the transaction information further comprises a number of the people in the group wanting to leave a review associated with the transaction, a number of items ordered, a number of a type of item ordered, a number of services ordered, or a number of a type of service ordered.

11. A method for customer review, the method comprising:
receiving transaction information for a single transaction, the transaction information including a number of people in a group, the group comprising a plurality of people, the number of people being greater than 1;
determining, by a point-of-sale (POS) system, an amount of the single transaction representing a total bill for the group;
determining, by the POS system, a number of codes to generate based on the transaction information, the number of codes being greater than 1;
transmitting, by the POS system, the amount of the single transaction, the transaction information, and the determined number of codes to generate to a server;
in response to the server receiving the amount of the single transaction, the transaction information, and the number of codes to generate, generating, by the server, a plurality of customer codes, a number of the plurality of customer codes being equal to the determined number of codes, each generated customer code being unique from one another, each of the generated plurality of customer codes respectively corresponding to different people in the group;
transmitting, by the server, the generated plurality of customer codes to the POS system;
in response to the POS system receiving the generated plurality of customer codes, generating, by the POS system, a single transaction receipt associated with the single transaction, the single transaction receipt including the single transaction amount and the generated plurality of customer codes, each of the generated plurality of customer codes corresponding to different people in the group;

receiving, by at least one customer device, a respective customer code;

transmitting, by the at least one customer device, the respective customer code to the server;

determining, by the server, whether the respective customer code is authentic based on the respective customer code being among the generated plurality of customer codes;

in response to the server determining that the respective customer code is authentic, enabling, by the server, the at least one customer device to provide a review from one person in the group, the one person being associated with the respective customer code, and receive a respective review corresponding to any of the plurality of customer codes associated with the single transaction.

12. The method of claim 11, further comprising, in response to the server determining that the respective customer code is authentic, associating, by the server, the transaction with a user account.

13. The method of claim 12, further comprising transmitting, by the server, a reminder for an unreviewed transaction associated with the user account.

14. The method of claim 11, further comprising, in response to the POS receiving a near field communication from the customer device, associating, by the server, the transaction with a user account.

15. The method of claim 12, further comprising, in response to receiving the review associated with the transaction, publishing, by the server, the review to a third-party platform.

16. The method of claim 14, further comprising transmitting, by the server, a notification to an individual related to the user account when the individual is within proximity of the POS system.

17. The method of claim 12, further comprising associating, by the server, a promotion to the user account based on the transaction.

18. The method of claim 17, further comprising:

determining, by the server, whether the review associated with the transaction has been received, p1 wherein the associating the promotion to the user account is further based on the determination of whether the review associated with the transaction has been received.

19. The method of claim 11, wherein at least two of the generated plurality of customer codes are respectively associated with a different person.

20. The method of claim 11, wherein the transaction information further comprises a number of the people in the group wanting to leave a review associated with the transaction, a number of items ordered, a number of a type of item ordered, a number of services ordered, or a number of a type of service ordered.

* * * * *